Figure 1:
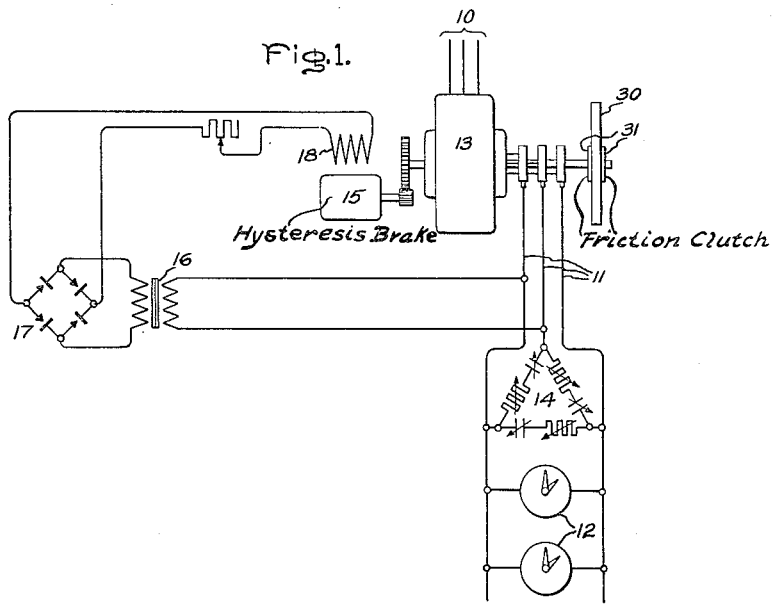

March 16, 1937.    M. S. MEAD, JR    2,074,126
FREQUENCY REGULATING SYSTEM
Filed July 12, 1935

Inventor:
Milton S. Mead, Jr.,
by Harry E. Dunham
His Attorney.

Patented Mar. 16, 1937

2,074,126

UNITED STATES PATENT OFFICE 2,074,126

FREQUENCY REGULATING SYSTEM

Milton S. Mead, Jr., Schenectady, N. Y., assignor to General Electric Company, a corporation of New York Application July 12, 1935, Serial No. 31,040

9 Claims. (Cl. 172—281)

My invention relates to frequency-regulating systems and may be considered to relate to improvements in the type of frequency-regulating system described in United States Letters Patent No. 1,522,216, Warren, January 6, 1925.

According to said patent, alternating current is supplied from a primary system through a rotary transformer to a secondary alternating-current system of lower frequency. The speed of the rotary transformer is controlled through a mechanical brake in response to apparatus which compares the integrated frequency of the secondary system with time as measured by a clock so as to maintain the secondary frequency at a constant average value regardless of variations in the frequency of the primary system.

The present invention relates to improvements in the control of the rotary transformer, one feature of which is to provide a frequency sensitive load on the secondary system, which load, since it is transmitted through the rotary transformer operating as a high slip induction motor, has an inherent desirable speed-regulating effect thereon. In place of a mechanical brake, I employ an electrical brake and energize this brake in response to voltage variations of the secondary system. The clock of the previous system is not required but I may modify the electric-braking action in response to a standard frequency. It is also desirable to provide a friction inertia damper on the rotating part of the frequency changer. This may comprise a flywheel connected to the shaft of the frequency changer by friction. By means of these improvements, the instantaneous as well as the average value of the secondary frequency may be maintained constant, notwithstanding considerable frequency and voltage variation on the primary system.

The features of my invention which are believed to be novel and patentable will be pointed out in the claims appended hereto. For a better understanding of my invention, reference is made in the following description to the accompanying drawing, Fig. 1 of which represents the essential features of the present invention without the standard frequency biasing feature which, however, is incorporated in the apparatus shown in Fig. 2.

Referring now to the drawing wherein like parts in both figures are represented by like reference characters, the lines indicated by reference character 10 may be taken to represent an existing or primary three-phase alternating-current power system which is subject to appreciable variations in voltage and frequency, such as one may expect on a power system on which the load varies considerably. For example, the system 10 may be a 60 cycle system supplied by turbo-alternators for furnishing power to the propelling motors and other electrical apparatus on a naval vessel, such that we may expect a frequency variation that would prohibit the use of the system for the distribution of time by means of synchronous motor driven secondary clocks and a voltage variation that would cause appreciable variation in the speed of induction motors connected thereto. The lines represented by reference character 11 will then represent an alternating-current system on which it is desired that the frequency shall be maintained constant and suitable for supplying synchronous motor driven secondary clocks such as are represented at 12.

System 11 is supplied from system 10 through a rotary transformer 13. Machine 13 acts partly as a transformer and partly as an induction motor and it will be assumed that the frequency of system 11 is 50 cycles. The primary of this machine is three phase and the secondary is represented as three phase although a single-phase secondary might be used. It may be assumed that the load on system 11 represented by the clocks 12 will remain substantially constant or that, if this load is changed from time to time by an amount sufficient to disturb the speed adjustment of the rotary transformer, a compensating adjustment will be made in the speed-regulating apparatus hereinafter described. Assuming a constant load on the secondary system 11 and a constant voltage on the primary system 10, it will be evident that, without regulation, the frequency of system 11 would tend to rise and fall with a rise and fall of frequency on the primary system 10. Also, assuming constant frequency of system 10 and constant load on system 11, it will be evident that, without regulation, the frequency of system 11 will vary with voltage changes on system 10 as this will tend to vary the speed of the rotary transformer acting as an induction motor. Also, the frequency and voltage of primary system 10 may both vary simultaneously in a variety of relations. The regulation required of the rotary transformer must, therefore, take into consideration variations in frequency and variations in voltage of the primary system 10 and various combinations of such variations.

The rotor of the rotary transformer should rotate by induction motor action at high slip in order to have reasonably efficient transformer action and a practicable secondary voltage and frequency, and such operation should be stable under normal conditions.

The regulating feature of the rotary transformer for meeting the conditions outlined above includes a frequency sensitive load across the secondary system as represented at 14. The load power drawn thereby will tend to increase with an increase in secondary frequency and vice versa. Where the rotary transformer has a three-phase secondary, the capacitance load may be three phase as indicated.

A torque-balancing load in the form of a hysteresis generator 15 is connected to be driven by the rotor element of the rotary transformer acting as an induction motor. The hysteresis generator is excited by direct current supplied from the secondary system 11. In Fig. 1, energy is taken from system 11 through a transformer 16 and a full-wave rectifier 17 and is fed to the stationary exciting winding 18 of the electric brake constituting the hysteresis machine. The rotor 15 of this machine is made of hysteresis magnetic material and is geared to be driven by machine 13 at a relatively high speed to secure high generating efficiency.

The hysteresis machine has characteristics like a hysteresis motor in that its torque is independent of its speed, but this torque power is now dissipated in the rotor and is proportional to the excitation supplied to the field winding 18. This hysteresis brake torque-balancing machine allows the rotor of the frequency changer 13 to turn at such a speed that it furnishes constant frequency to the load on system 11 regardless of variations in primary frequency and voltage within reasonable limits. To give a practical example, the primary system may be a 60 cycle, 220 volt system and the secondary system may be a 110 volt, 50 cycle system. The frequency changer may have six poles and run at speeds varying between one hundred and three hundred revolutions per minute for primary frequency variations between 55 and 65 cycles.

To accomplish the desired object, the apparatus must have stable operating characteristics under normal conditions. Let us assume that we have 60 cycles and 220 volts on the primary, a frequency changer speed of two hundred revolutions per minute, and 50 cycles, 110 volts on the secondary, and let us suppose that the speed tends to increase. In this case, the secondary voltage would decrease and less induction motor torque would be required to maintain the new speed. The field current of the hysteresis brake would decrease and, therefore, the hysteresis machine would furnish less braking. This decrease in braking just matches the decrease in induction motor torque required so that so far no speed-restoring torque is available. However, the rotor frequency is now less than 50 cycles and, since the secondary load 14 is capacitative, less secondary current flows than is accounted for by the decrease in secondary voltage, thus lowering the induction motor torque. It follows, therefore, that the hysteresis machine is supplying more braking than is required and, hence, the frequency changer must slow down. Thus, it is seen that torques are present that oppose any change in speed above or below normal under normal conditions. Consequently, the apparatus has stable operating characteristics.

Let us next consider a change in primary frequency from normal. Assume that the primary frequency rises. Since the machine 15 is a transformer and has inductance reactance, an increase in primary frequency will decrease the transformer flux and lower the secondary voltage so that both the secondary load current and the field of the torque-balancing machine decrease and no change in rotor speed would occur due to this fact alone. However, an increase in primary frequency with constant speed increases the secondary frequency and, because of the capacitance load 14, more power would be supplied to the secondary system. An increase in secondary frequency alone has no effect on the hysteresis brake and its torque, therefore, corresponds to the decreased secondary voltage. However, the increased secondary current due to the increase in load taken by the capacitance upon an increase in secondary frequency produces more induction motor torque in the frequency changer and, as a result, its speed increases until the torques balance and the secondary frequency is restored to 50 cycles. A decrease in primary frequency would have the opposite effects to restore the balance. It follows that, at any other output frequency than normal, the load power causes an unbalanced torque on the rotor of the frequency changer, which changes the rotor speed in the proper direction and the proper amount to produce 50 cycle rotor output current.

Finally, let us consider the effect of a change in primary line voltage. An increase or decrease in primary line voltage has no other effect than varying the secondary voltage in the same relation. The increase in secondary load current caused by such increase in voltage increases the induction motor torque in the frequency changer but this is exactly balanced by a corresponding increase in hysteresis braking torque so that no change in the frequency changer speed or secondary frequency occurs due to primary voltage changes.

The regulation above outlined is accompanied by changes in speed of the rotor of the frequency changer; that is, we have an oscillatory mechanical motion superimposed on the continuous rotation of the rotary parts. Some damping force is desirable to restrict this oscillation and prevent hunting. To supply such damping force, I provide a flywheel 30, which may be mounted on the shaft of the frequency converter by ball bearings so that it is free to turn thereon. I then provide a friction coupling between the flywheel and shaft on which it is mounted, which coupling is sufficient to drive the flywheel under steady speed conditions but it can slip readily under other conditions. This coupling is indicated by the disc-shaped pads 31 secured to the shaft and contacting the flywheel on opposite sides thereof. A sudden change in speed of the frequency changer is thus damped by the friction load incident to relative motion between the flywheel and rotary part of the frequency changer and prevents over-regulation and hunting. This friction inertia means is not so essential in the scheme of Fig. 1 as it is in the scheme of Fig. 2 where the regulation is more exacting.

From the above, it will be evident that the apparatus is stable in operation and will produce correct secondary frequency under normal conditions, that variations in primary voltage have no undesirable results, and that the apparatus quickly responds to changes in primary frequency to maintain the secondary frequency substantially constant, the variation in secondary frequency being only that small amount which is deflected in the secondary system incident to the regulation of the apparatus at the instant when primary frequency changes occur. It will be noted that the capacitance load represented at 14 has some resistance component and that provision is made for adjusting the magnitude and character of this load. This will be helpful in a system where additional clocks or other load devices are added to the secondary system from time to time as it will be evident that, when such load is added, it may be counter-balanced by adjustment of the magnitude and character of the load at 14. As a matter of fact, each clock may have the correct amount of capacitance in series therewith and the load 14 may thus represent a variable number of such clocks.

The field circuit of the hysteresis torque-balancing machine may also contain an adjustable resistance where desirable to assist in making the initial torque adjustments and such adjustments as may be called for later.

In most cases, the apparatus represented in Fig. 1 will produce sufficiently accurate average secondary frequency for synchronous motor driven clock systems. The instantaneous secondary frequency will also be maintained substantially constant, thus increasing the usefulness of the system over one that merely corrects for integrated frequency errors. A higher degree of frequency-maintaining accuracy may, however, be obtained by adding a frequency standard bias to the apparatus as represented in Fig. 2.

Figure 2:
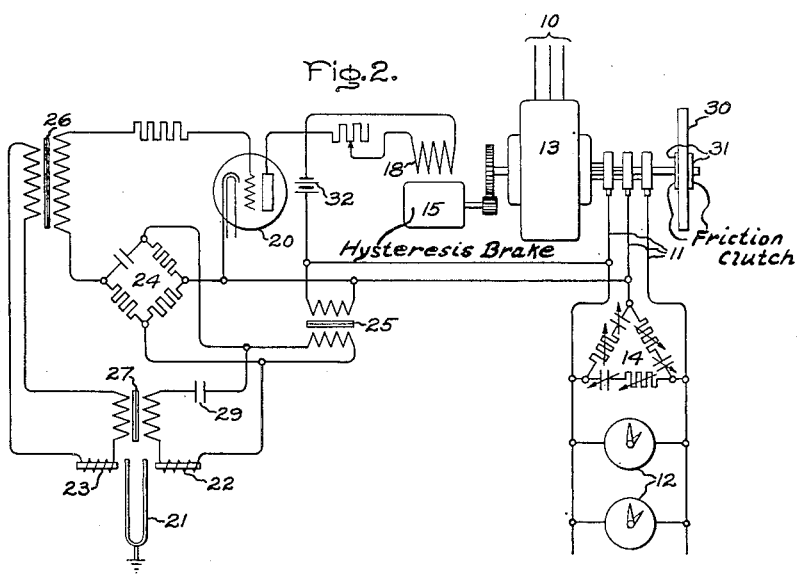

In Fig. 2, the field 18 of the hysteresis load machine 15 is supplied from the secondary system 11 through a tube rectifier represented at 20. The output of tube 20 and, hence, the load supplied by generator 15 is controlled in response to slight departures of the frequency of system 11 from a standard frequency generated by a tuning fork frequency generator comprising a tuning fork 21, a driving coil 22, and a pick-up coil 23.

The control of tube 20 is accomplished by controlling the phase relation between the voltage applied to the grid of the tube and that applied to the plate. A phase-shifting bridge 24 is provided which is supplied through transformer 25 from lines 11 and which supplies the normal grid voltage. The phase of the grid supply voltage is normally shifted ninety degrees from the plate voltage by bridge 24. If the secondary frequency on lines 11 is correct, the tube 20 then supplies normal excitation current to field winding 18 and the tuning fork generator does not have any controlling action because the voltage supplied by it through the coupling transformer 26 is then in phase with that supplied by the bridge 24.

The fork 21 is tuned to supply exactly the correct frequency of lines 11. If now the frequency of lines 11 starts to drop, it will be evidenced by a shift in phase between the voltages supplied to the grid by bridge 24 and the tuning fork voltage which is superimposed on the grid circuit through transformer 26. The resultant phase angle of the voltage applied to the grid will advance with respect to the plate voltage and a greater current will be supplied to field winding 18. This immediately corrects the tendency of system frequency 11 to drop and restores the phase relation to normal in the control circuit. If, on the other hand, the system frequency 11 tends to rise above normal, the tuning fork generator shifts the phase angle of the grid voltage in the other direction and reduces the output of tube 20, thereby reducing the hysteresis generator load and allowing the frequency converter 13 to advance in speed to restore system 11 frequency and the phase relation thereof with respect to the tuning fork 21.

The generator circuit of tuning fork 21 receives some excitation through a transformer 27. The primary circuit of this transformer includes the fork driving coil 22 and a condenser 29. The condenser 29 establishes the same phase relation of the tuning fork generator and generator excitation as is established by the phase-shifting bridge 24 when the frequency and phase relation of system 11 are correct. However, when the system frequency starts to depart from normal, the voltage generated by the tuning fork does not change and the resulting difference in phase relation of the two sources supplying the grid of tube 20 produces a resultant phase angle grid bias in a direction and by an amount sufficient to restore the system frequency 11 to normal. Since only a nominal change in the plate current of tube 20 is required to keep the frequency of system 11 exactly right, the phase angle between fork driving current and fork output voltage need change very little. It will be appreciated that the frequency-biasing control of Fig. 2 will automatically adjust itself to take care of considerable change in load on system 11.

Another advantage of this system lies in the fact that, if due to some energy condition the fork stops vibrating, the circuit automatically restores itself to normal as soon as approximately normal frequency conditions are restored as the fork 21 will quickly build up its vibrations and again secure control.

The direct-current source indicated at 32 in the plate circuit of the tube 20 is to assure that the current in this circuit will be proportional to the voltage of the secondary system 11. The polarity of this source is such that it tends to produce a current flow in the plate circuit in the same direction as that of the tube 20, and the voltage of source 32 is of such value as to combine with the action of the tube to make the current flow in the plate circuit strictly proportional to the voltage applied to the tube from system 11. Under this condition, the counter-torque of the hysteresis generator increases and decreases in the same manner as the torque of the frequency changer varies and, therefore, the torque balance is maintained and no speed change occurs or tries to occur when the speed is correct.

Other modifications of the schemes described coming within the true spirit and scope of my invention are intended to be covered by the claims hereof.

What I claim as new and desire to secure by Letters Patent of the United States, is:—

1. In combination, a source of alternating current, an induction motor of the wound secondary type having its primary connected to said source, a frequency-responsive electrical load supplied from the secondary of said motor, and means for producing a mechanical load on said motor which is responsive to and proportional to the secondary voltage of said motor, said frequency-responsive electrical load and said voltage-responsive mechanical load serving to control the speed of said induction motor such that its secondary frequency is substantially constant and of a value which is a major fraction of the average value of its primary frequency.

2. In combination, a source of alternating current of commercial frequency subject to frequency and voltage variations, an induction motor of the wound secondary type having its primary supplied by said source, an electrical load supplied from the secondary of said motor, said load being responsive to and proportional to the frequency supplied thereto, and a load driven mechanically by said motor which is responsive to and proportional to the secondary voltage of said motor, said two loads serving to control the speed of said induction motor to cause it to operate both as a motor and as a transformer, the secondary frequency of which is substantially constant and of a value which is a major fraction of the average value of said source.

3. Frequency-transforming apparatus comprising an induction motor of the wound secondary type adapted to have its primary supplied from an alternating-current source and its secondary connected to supply an alternating-current distribution system, a load driven by said motor which is responsive to and proportional to the secondary voltage of said motor, and an electrical load supplied by the secondary of said motor which is responsive to and proportional to the secondary frequency of said motor, said loads being so proportioned that the secondary frequency of said motor is maintained substantially constant and at a value which is a major fraction of the average value of the primary frequency of said motor.

4. Frequency-transforming apparatus comprising a wound secondary induction motor, a mechanical load driven thereby with a torque which is independent of the speed of said motor but which is proportional to the secondary voltage of said motor, and an electrical load supplied by the secondary winding of said motor, said load being responsive to and proportional to the secondary frequency of said motor, said loads serving to control the speed of said motor so as to cause it to produce a substantially constant secondary frequency when its primary is supplied from a higher frequency alternating-current source subject to frequency variations.

5. Frequency-transforming apparatus comprising a wound secondary induction motor, a hysteresis load machine connected to be driven by said motor, means for exciting said hysteresis machine by direct current proportional to the secondary voltage of said motor, means for damping sudden speed changes of said induction motor, and an electrical load, the value of which varies in proportion to the frequency of the current supplied thereto, connected across the secondary winding of said induction motor.

6. Frequency-transforming apparatus comprising a wound secondary induction machine, an electrical load machine driven by said induction machine and furnishing a load proportional to the direct-current excitation supplied thereto, means for supplying direct-current excitation to said load machine in proportion to the secondary voltage of said induction machine, an electrical load supplied by alternating current from the secondary of said induction machine, said last mentioned load being proportional to the secondary frequency of said induction machine, means for establishing a standard constant frequency equal to the desired secondary frequency of said induction machine, and means for comparing said standard frequency with the secondary frequency of said induction machine and for modifying the excitation of said load machine when the secondary frequency of said induction machine tends to depart from said standard frequency so as to hold said secondary frequency constant at said standard value.

7. Frequency-transforming apparatus comprising a wound secondary induction machine adapted to be supplied from an alternating-current source and to supply a lower frequency alternating current from its secondary, means for damping sudden changes in speed of said machine, control apparatus for maintaining the secondary frequency of said induction machine constant, said control apparatus including an electrical load machine driven by said induction machine and furnishing a load proportional to the excitation of said load machine, means for furnishing direct-current excitation to said load machine from the secondary of said induction machine comprising a circuit therebetween in which a grid controlled rectifying tube is included, means for impressing an alternating voltage on the grid of said tube which is approximately ninety degrees out of phase with the voltage across said tube and proportional to the secondary voltage of said induction machine, a tuning fork generator for supplying a standard frequency equal to the desired secondary frequency of said induction machine, and means for superimposing said standard frequency on the grid bias of said tube to vary the excitation current to said load machine when the secondary frequency of said induction machine tends to depart from said standard frequency in a direction and by an amount sufficient to check such departure.

8. In combination with a rotary machine furnishing alternating current, apparatus for regulating the speed of such machine to maintain constant the frequency of the alternating current supplied comprising electrically-energized speed-regulating means for such machine, the controlling action of which means varies with variations in the magnitude of energizing current supplied thereto, an energizing circuit for said regulating means deriving its supply from the alternating-current supply terminals of said rotary machine, a gaseous rectifier tube in said circuit, said tube having a control grid, means for impressing on said control grid an alternating voltage, the phase of which is shifted approximately ninety degrees from the alternating voltage across said tube, a tuning fork generator tuned to supply a standard frequency equal to the desired constant frequency of said rotary machine, means for super-imposing said standard frequency on said grid in phase with the voltage already existing thereon when the frequency supplied by said rotary machine is at the desired value such that, when said last mentioned frequency departs from the desired value, the phase of the grid bias of said tube is shifted in a direction and by an amount proportional to such departure thereby causing the excitation supplied to said speed-regulating means to increase or decrease in a direction and by an amount to check such departure, and a driving coil for said tuning fork generator supplied at the frequency of said rotary machine whereby, should the last mentioned frequency depart considerably from that desired, the tuning fork generator ceases to function but automatically resumes control as soon as the frequency of said rotary machine approaches the desired value.

9. In combination with a rotary machine for supplying alternating current, apparatus for regulating the speed of such machine to maintain constant the frequency of the alternating current supplied, said apparatus including electric speed-control means for said machine, the controlling action of which depends upon the magnitude of the current supplied thereto, said electric speed-control means being included in a circuit containing a gaseous rectifying tube and supplied from the alternating-current terminals of said rotary machine, said tube having a control grid, a tuning fork generator for generating a standard frequency equal to the constant frequency desired of said rotary machine, connections for impressing said standard frequency on said control grid in approximately a ninety degree out-of-phase relation with respect to the voltage across said tube when the frequency supplied by said rotary machine is correct whereby, when the last mentioned frequency departs from the desired value, the phase relation between the voltages across said tube and on said grid shifts in a direction to increase or decrease the current supplied to said electric speed control and to check such departure, and a driving coil for said tuning fork generator supplied at the frequency produced by said rotary machine.

MILTON S. MEAD, JR.